(12) United States Patent
Sakai

(10) Patent No.: US 8,112,277 B2
(45) Date of Patent: Feb. 7, 2012

(54) APPARATUS, METHOD, AND PROGRAM FOR CLUSTERING PHONEMIC MODELS

(75) Inventor: Masaru Sakai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 807 days.

(21) Appl. No.: 12/234,729

(22) Filed: Sep. 22, 2008

(65) Prior Publication Data

US 2009/0177472 A1    Jul. 9, 2009

(30) Foreign Application Priority Data

Oct. 24, 2007   (JP) ................................ 2007-276236

(51) Int. Cl.
*G10L 15/06* (2006.01)
(52) U.S. Cl. ...................................................... 704/245
(58) Field of Classification Search .......... 704/242–245, 704/256–256.2
See application file for complete search history.

(56) References Cited

U.S. PATENT DOCUMENTS

| | | | | |
|---|---|---|---|---|
| 4,852,173 | A * | 7/1989 | Bahl et al. ..................... | 704/240 |
| 5,794,197 | A * | 8/1998 | Alleva et al. .................. | 704/255 |
| 6,163,769 | A * | 12/2000 | Acero et al. .................. | 704/260 |
| 6,317,712 | B1 * | 11/2001 | Kao et al. .................... | 704/256.3 |
| 6,374,222 | B1 * | 4/2002 | Kao .............................. | 704/256.1 |
| 6,430,532 | B2 * | 8/2002 | Holzapfel ..................... | 704/258 |
| 6,711,541 | B1 * | 3/2004 | Kuhn et al. .................. | 704/242 |
| 7,389,229 | B2 * | 6/2008 | Billa et al. ................... | 704/242 |
| 2004/0044528 | A1 * | 3/2004 | Chelba et al. ................ | 704/249 |
| 2009/0222266 | A1 | 9/2009 | Sakai | |

FOREIGN PATENT DOCUMENTS

| | | |
|---|---|---|
| JP | 09-198080 | 7/1997 |
| JP | 2001-100779 | 4/2001 |
| JP | 2003-308089 | 10/2003 |
| JP | 2004-117503 | 4/2004 |

OTHER PUBLICATIONS

Young, et al., Tree-Based State Tying for High Accuracy Acoustic Modelling, Proceedings of the Human Language Technology, pp. 307-312, 1994.
Diehl, et al., Constraint Induction of Phonetic-Acoustic Decision Trees for Crosslingual Acoustic Modelling, Proc. of ICASSP pp. 761-764, 2007.
Japanese Decision of a Patent Grant for 2007-276236 mailed on Oct. 6, 2009.

* cited by examiner

*Primary Examiner* — Abul Azad
(74) *Attorney, Agent, or Firm* — Turocy & Watson, LLP

(57) ABSTRACT

A node initializing unit generates a root node including inputted phonemic models. A candidate generating unit generates candidates of a pair of child sets by partitioning a set of phonemic models included in a node having no child node into two. A candidate deleting unit deletes candidates each including only phonemic models attached with determination information indicating that at least one of the child sets has a small amount of speech data for training. A similarity calculating unit calculates a sum of similarities among the phonemic models included in the child sets. A candidate selecting unit selects one of the candidates having a largest sum. A node generating unit generates two nodes including the two child sets included in the selected candidate, respectively. A clustering unit clusters the phonemic models in units of phonemic model sets each included in a node.

6 Claims, 9 Drawing Sheets

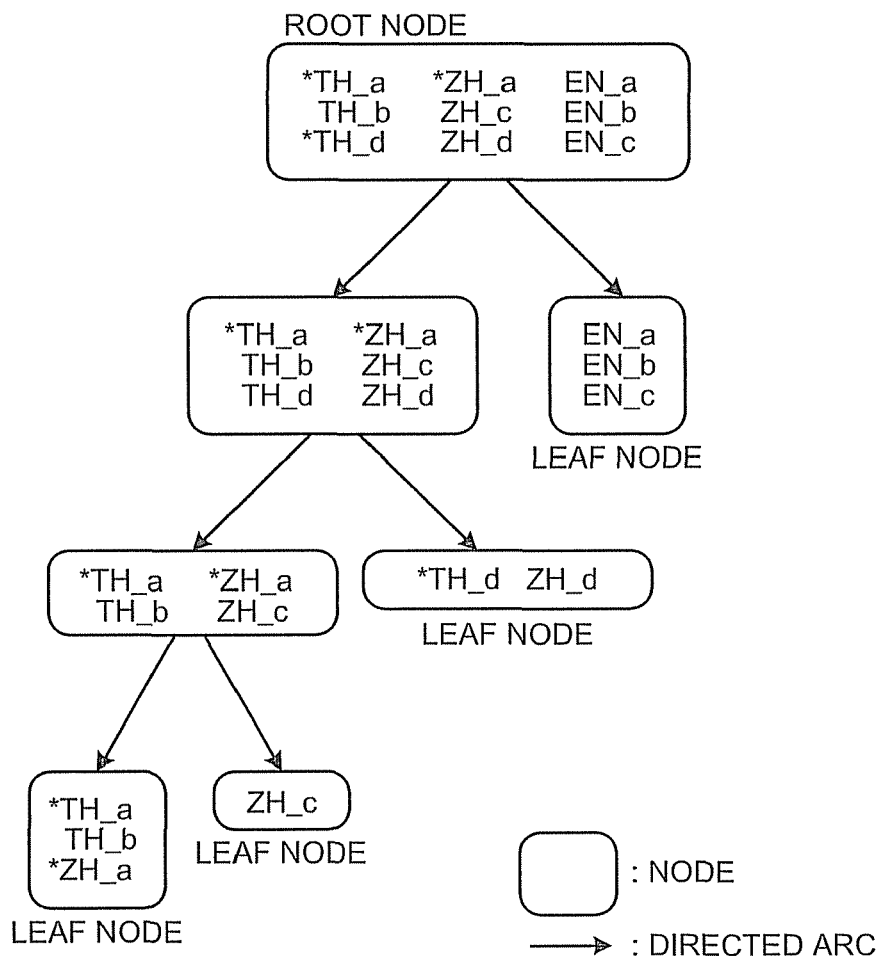

ROOT NODE

| PARTITIONING CANDIDATE | APPLIED QUESTION | CHILD SET 1 | CHILD SET 2 |
|---|---|---|---|
| A1 | is_ph=a? (is_ph=(b|c)?) | *TH_a, *ZH_a | TH_b, ZH_c |
| A2 | is_ph=b? (is_ph=(a|c)?) | TH_b | *TH_a, *ZH_a, ZH_c |
| A3 | is_ph=c? (is_ph=(a|b)?) | ZH_c | *TH_a, TH_b, *ZH_a |
| A4 | is_lang=TH? (is_lang=ZH?) | *TH_a, TH_b | *ZH_a, ZH_c |

FIG.8

| PARTITIONING CANDIDATE | APPLIED QUESTION | CHILD SET 1 | CHILD SET 2 |
|---|---|---|---|
| A1 (DELETE) | is_ph=a? (is_ph=(b|c)?) | *TH_a, *ZH_a | TH_b, ZH_c |
| A2 | is_ph=b? (is_ph=(a|c)?) | TH_b | *TH_a, *ZH_a, ZH_c |
| A3 | is_ph=c? (is_ph=(a|b)?) | ZH_c | *TH_a, TH_b, *ZH_a |
| A4 | is_lang=TH? (is_lang=ZH?) | *TH_a, TH_b | *ZH_a, ZH_c |

FIG.9

| PARTITIONING CANDIDATE | APPLIED QUESTION | CHILD SET 1 | CHILD SET 2 | SUM OF CROSS-SIMILARITIES |
|---|---|---|---|---|
| A2 | is_ph=b? (is_ph=(a|c)?) | TH_b | *TH_a, *ZH_a, ZH_c | 100 |
| A3 (SELECT) | is_ph=c? (is_ph=(a|b)?) | ZH_c | *TH_a, TH_b, *ZH_a | 200 |
| A4 | is_lang=TH? (is_lang=ZH?) | *TH_a, TH_b | *ZH_a, ZH_c | 50 |
| B1 | is_lang=a? | EN_a | EN_b, EN_c | 150 |
| B2 | is_lang=b? | EN_b | EN_a, EN_c | 100 |
| ... | | | | |

FIG.12

| PARTITIONING CANDIDATE | CHILD SET 1 | CHILD SET 2 |
|---|---|---|
| A1 | *TH_a | TH_b, *ZH_a, ZH_c |
| A2 | TH_b | *TH_a, *ZH_a, ZH_c |
| A3 | *ZH_a | *TH_a, TH_b, ZH_c |
| A4 | ZH_c | *TH_a, TH_b, *ZH_a |
| A5 | *TH_a, TH_b | *ZH_a, ZH_c |
| A6 | *TH_a, *ZH_a | TH_b, ZH_c |
| A7 | *TH_a, ZH_c | TH_b, *ZH_a |

FIG.13

| | PARTITIONING CANDIDATE | CHILD SET 1 | CHILD SET 2 |
|---|---|---|---|
| DELETE → | A1 | *TH_a | TH_b, *ZH_a, ZH_c |
| | A2 | TH_b | *TH_a, *ZH_a, ZH_c |
| DELETE → | A3 | *ZH_a | *TH_a, TH_b, ZH_c |
| | A4 | ZH_c | *TH_a, TH_b, *ZH_a |
| | A5 | *TH_a, TH_b | *ZH_a, ZH_c |
| DELETE → | A6 | *TH_a, *ZH_a | TH_b, ZH_c |
| | A7 | *TH_a, ZH_c | TH_b, *ZH_a |

ми́с мо́del by the adaptive training, it is necessary that, for an

APPARATUS, METHOD, AND PROGRAM FOR CLUSTERING PHONEMIC MODELS

CROSS-REFERENCE TO RELATED APPLICATIONS

This application is based upon and claims the benefit of priority from the prior Japanese Patent Application No. 2007-276236, filed on Oct. 24, 2007; the entire contents of which are incorporated herein by reference.

BACKGROUND OF THE INVENTION

1. Field of the Invention

The present invention relates to an apparatus, a method, and a program for clustering phonemic models by regarding nodes in a tree structure as clusters.

2. Description of the Related Art

In a field of speech recognition, a technique that enables to represent acoustical features of input speech by respective probability models of phonemes is commonly used. These probability models are called "phonemic models". The phonemic model is obtained by statistically training parameters of the phonemic model using speech data of phonemes that are pronounced. Accuracy of the phonemic model depends on the speech data used in the training. Therefore, to obtain a highly-accurate phonemic model, it is preferable that the training of the phonemic model be performed by using as much speech data as possible.

However, in some cases, so much speech data cannot be used in the training of the phonemic model. For example, in the case of Southeast Asian languages including Thai, only a small amount of speech data can be utilized for the training of some phonemic models. Therefore, only a less-accurate phonemic model can be obtained as compared to Euro-American languages, or the like, which enable to utilize a relatively large amount of speech data. In addition, there are discriminations between short vowels and long vowels in phonemes of Thai, and less speech data can be utilized for long vowels than for short vowels in some phonemes. In such phonemes, the phonemic models of the long vowels have relatively lower accuracy than the phonemic models of the short vowels.

To train the phonemic model having only a small amount of speech data that can be used for training with high accuracy, a well-known method called "adaptive training" is applied. In the adaptive training of a phonemic model A having only a small amount of usable speech data, a phonemic model B different from the phonemic model A is selected, and an initial phonemic model is obtained by performing training using speech data corresponding to the phonemic models A and B. Parameters of the initial phonemic model are then adaptively updated using the small amount of speech data corresponding to the phonemic model A, thereby training the phonemic model A. As described above, the adaptive training is a technique that enables to adaptively update parameters of an initial phonemic model by using speech data corresponding to a phonemic model to be trained (training-target phonemic model), thereby obtaining the training-target phonemic model based on the initial phonemic model.

It is known, in the adaptive training, that a phonemic model sufficiently similar to a training-target phonemic model is selected as an initial phonemic model, and that a highly-accurate initial phonemic model is prepared, so that a highly-accurate phonemic model can be obtained even when there are less speech data corresponding to the training-target phonemic model. Therefore, to obtain a highly-accurate phonemic model by the adaptive training, it is necessary that, for an arbitrary phonemic model of a certain language, at least another phonemic model of the same language, or at least one of phonemic models of another language similar to the arbitrary phonemic model be obtained.

To obtain phonemic models similar to each other, a technique is known that enables to cluster phonemic models using a tree structure. This technique enables to obtain at least one phonemic model cluster including a set of phonemic models similar to each other, from among all phonemic models to be clustered (clustering-target phonemic models).

For example, Japanese Patent No. 3547349 and "Tree-based state tying for high accuracy acoustic modeling" (S. J. Young et al., Proceedings of the workshop on Human Language Technology, 1994, pp. 307 to 312, FIG. 2) has proposed techniques that enable to cluster phonemic models using a decision tree. In the techniques using a decision tree, questions associated with types of clustering-target phonemic models are applied starting from a root node including all of the clustering-target phonemic models, thereby hierarchically adding new child nodes each including a child set of phonemic models similar to each other, and generating a tree structure composed of nodes each including a set of phonemic models. A set of phonemic models included in a node having no child node (leaf node) in the generated tree structure is obtained as a cluster of phonemic models.

The set of phonemic models similar to each other can be obtained by focusing on the cluster of the phonemic models thus obtained. That is, with respect to an arbitrary phonemic model of a certain language, at least one of phonemic models belonging to a phonemic model cluster including the arbitrary phonemic model can be selected as another phonemic model similar to the arbitrary phonemic model.

In the techniques proposed in Japanese Patent No. 3547349 and "Tree-based state tying for high accuracy acoustic modeling", however, the phonemic models are classified only based on similarity of the phonemic models. Therefore, a cluster including only phonemic models that allow utilizing only a small amount of speech data for training may be generated. In such a case, accuracy of an initial phonemic model is low, and therefore an enhanced accuracy of the phonemic model according to the adaptive training cannot be assured.

SUMMARY OF THE INVENTION

According to one aspect of the present invention, a clustering apparatus includes an input unit configured to input at least one phonemic model attached with determination information indicating a small amount of speech data for training, and at least one phonemic model not attached with the determination information; a node initializing unit configured to generate a node including the inputted phonemic models as a root node of a tree structure; a candidate generating unit configured to generate candidates of a pair of child sets for a node having no child node among nodes in the tree structure, by partitioning a set of phonemic models included in the node into two; a candidate deleting unit configured to delete a candidate including the two child sets at least one of which includes only phonemic models attached with the determination information, from the generated candidates; a similarity calculating unit configured to calculate a similarity among the phonemic models included in each of the two child sets included in each of the candidates other than the deleted candidates, and calculates a sum of the similarities calculated for the child sets; a candidate selecting unit configured to select one of the candidates having a largest calculated sum; a node generating unit configured to generate two nodes including two child sets included in the selected candidate, respectively, as child nodes of the node that is a generation source of the selected candidate; and a clustering unit configured to cluster the phonemic models in units of phonemic model sets included in nodes of the tree structure.

According to another aspect of the present invention, a clustering method includes inputting at least one phonemic model attached with determination information indicating a small amount of speech data for training, and at least one phonemic model not attached with the determination information; generating a node including the inputted phonemic models as a root node of a tree structure; generating candidates of a pair of child sets for a node having no child node among nodes in the tree structure, by partitioning a set of phonemic models included in the node into two; deleting a candidate including the two child sets at least one of which includes only phonemic models attached with the determination information, from the generated candidates; calculating a similarity among the phonemic models included in each of the two child sets included in each of the candidates other than the deleted candidates, and calculating a sum of the similarities calculated for the child sets; selecting one of the candidates having a largest calculated sum; generating two nodes including two child sets included in the selected candidate, respectively, as child nodes of the node that is a generation source of the selected candidate; and clustering the phonemic models in units of phonemic model sets included in nodes of the tree structure.

A program according to still another aspect of the present invention causes a computer to perform the method according to the present invention.

BRIEF DESCRIPTION OF THE DRAWINGS

FIG. 3 is a drawing illustrating an example of a tree structure used for clustering;

FIG. 4 is a drawing illustrating an example of a data structure of a question list;

FIG. 8 is a drawing illustrating an example of a partitioning candidate deleted;

FIG. 9 is a drawing illustrating an example of a partitioning candidate selected;

FIG. 12 is a drawing illustrating another example of partitioning candidates;

FIG. 13 is a drawing illustrating an example of partitioning candidates deleted from the partitioning candidates shown in FIG. 12 in a candidate deleting process;

DETAILED DESCRIPTION OF THE INVENTION

Exemplary embodiments an apparatus, a method, and a program for clustering phonemic models according to the present invention will be explained below in detail with reference to the accompanying drawings.

A clustering apparatus according to a first embodiment of the present invention clusters phonemic models to meet a requirement that an arbitrary phonemic model that allows utilizing only a small amount of speech data for training and at least one phonemic model that allows utilizing a large amount of speech data for training definitely belong to the same cluster.

Figure 1:
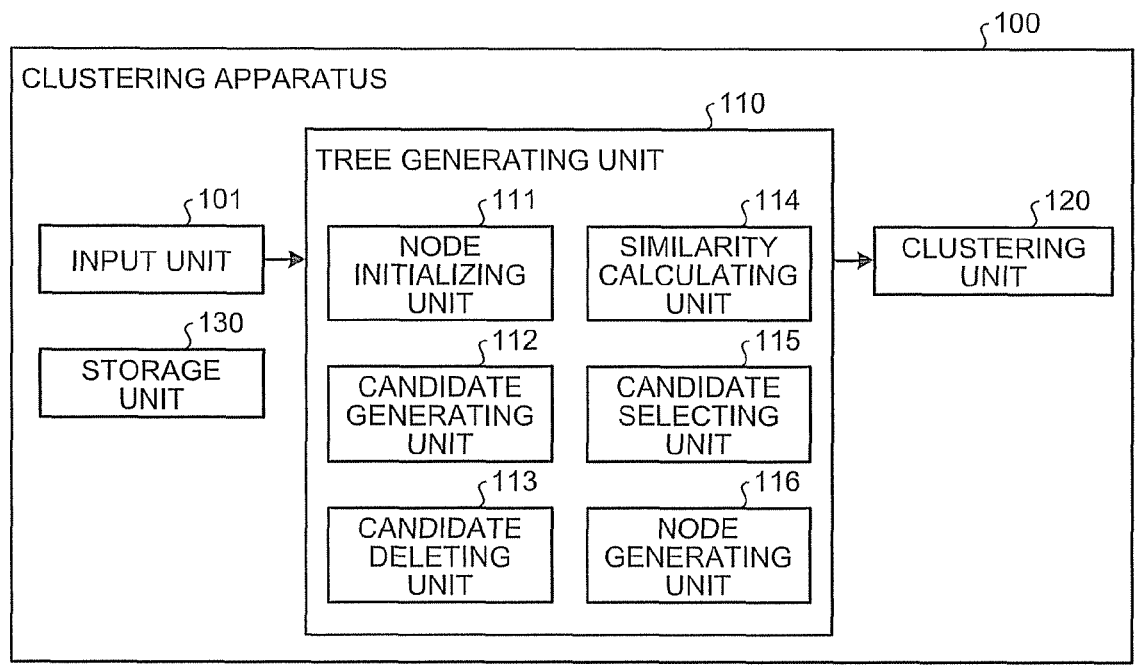
FIG. 1 is a block diagram of a clustering apparatus according to a first embodiment of the present invention.

As shown in FIG. 1, a clustering apparatus 100 includes a storage unit 130, an input unit 101, a tree generating unit 110, and a clustering unit 120.

The input unit 101 inputs phonemic models to be clustered. More specifically, the input unit 101 inputs at least one phonemic model attached with determination information (hereinafter, "determination tag") for determining a phonemic model that can obtain only a small amount of speech data for training, and at least one phonemic model not attached with the determination tag.

The input unit 101 can input phonemic models by any method commonly used. For example, the input unit 101 can input phonemic models from an external device connected through a network or the like, or can input phonemic models from a portable storage medium. The input unit 101 can input phonemic models that are previously stored in the storage unit 130, or the like.

In the first embodiment, the input unit 101 inputs phonemic models represented by a Hidden Markov Model (HMM). The HMM is defined by at least one state S1, a set SS of initial states, a set SF of final states, a probability Aji of transition from a state Sj to the state Sj or to another state S1, and an output probability Pi(X) of a speech feature vector X in the state S1. In this regard, $1 \leq i \leq NS$, and $1 \leq j \leq Ns$, where NS denotes a total number of states in the HMM. The output probability Pi(X) is given as: $Pi(X)=N(X;\mu i, \Sigma i)$ by using a multidimensional normal distribution $N(\mu i, \Sigma i)$, which is defined by an average vector $\mu i$, and a covariance matrix $\Sigma i$.

Figure 2:
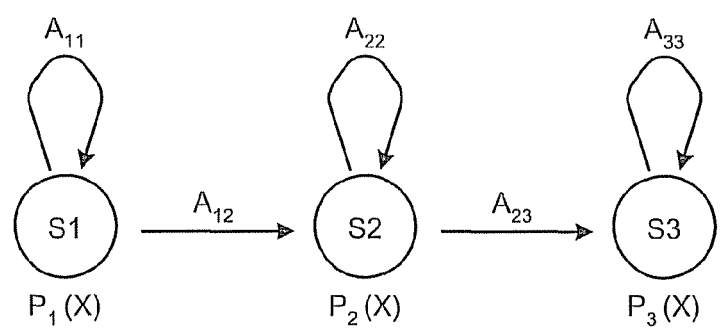
FIG. 2 is a drawing illustrating an example of a phonemic model to be inputted.

FIG. 2 depicts an example of the HMM in which the number NS of states is three. In FIG. 2, illustration of transition paths that have no transition probability of a significant value, that is, being always zero is omitted. In FIG. 2, an initial state set SS={S1}, and a final state set SF={S3}. The HMM shown in FIG. 2 is an example of the HMM typically used for the speech recognition. That is, FIG. 2 depicts an example of the HMM that has topology called "Left-to-Right type", in which the numbers of elements included in the initial state set SS and the final state set SF are one, respectively, and that has a significant transition probability Aji only for a transition path (j, i) having a relation of i=j or i=j+1.

While explanations are given assuming that the HMM as shown in FIG. 2 is used as a phonemic model, an applicable phonemic model is not limited to the HMM shown in FIG. 2, and an HMM according to any other method can be used. The HMM can be replaced by an arbitrary phonemic model as long as the phonemic model enables to calculate a cross-similarity indicating a degree of similarity among phonemic models.

When the HMM having two or more states as shown in FIG. 2 is used, clustering is performed for each of states at the same position in the HMM. For example, in the HMM as shown in FIG. 2, clustering for the states in the HMM is performed with respect to each of a first state S1, a second state S2, and a third state S3. In other words, when the HMM as shown in FIG. 2 is used, each of the states in the HMM correspond to a phonemic model. The clustering of each state as a phonemic model is performed by the number of states (NS times).

Returning to FIG. 1, the tree generating unit 110 generates a tree structure for clustering phonemic models. A specific example of a tree structure generated by the tree generating unit 110 is explained.

As shown in FIG. 3, the tree structure used for clustering of phonemic models is composed of nodes each including a set of phonemic models, and directed arcs each indicating a parent-child relation between nodes. One of two nodes connected by a directed arc on the side of the source of the directed arc is called "parent node", and the other node on the side of the destination of the directed arc is called "child node". A node having no parent node is called "root node", and a node having no child node is called "leaf node".

All nodes in the tree structure shown in FIG. 3 each include a set of phonemic models. For example, the root node shown in FIG. 3 includes nine phonemic models: "*TH_a", "TH_b", "*TH_d", "*ZH_a", "ZH_c", "ZH_d", "EN_a", "EN_b", and "EN_c". That is, FIG. 3 depicts an example in which phonemic models of phonemes a, b, and d of That (TH), phonemic models of phonemes a, c, and d of Chinese (ZH), and phonemic models of phonemes a, b, and c of English (EN) are inputted as clustering targets, and set as the root node.

As shown in FIG. 3, in the first embodiment, a name having a language type and a phoneme type combined in the form of "(language type)_(phoneme type)" is assigned to each phonemic model. For example, a phonemic model of a phoneme "a" of That is represented as "TH_a", and a phonemic model of a phoneme "c" of Chinese is represented as "ZH_c".

Phonemic models of different languages corresponding to the same phoneme type will be determined from phonetic viewpoints to correspond to crosslinguistically the same phoneme type. For example, "TH_a," "ZH_a," and "EN_a" will be phonemic models that are determined to correspond to a crosslinguistic phoneme type "a." The International Phonetic Alphabet (IPA) can be used for the crosslinguistic phoneme type, for example.

Actually, phonetic features of the phonemic models corresponding to crosslinguistically the same phoneme type "a" greatly vary according to languages. That is, even when phonemic models correspond to crosslinguistically the same phoneme type "a", the phonemic models are not always similar to each other if the phonemic models are of different languages. For example, the phonemic model "ZH_a" in Chinese or the phonemic model "EN_a" in English is not always similar to the phonemic model "TH_a" in Thai. In the first embodiment, a phonemic-model clustering method using a tree structure as described below is applied to select a phonemic model similar to a target phonemic model independently of the phoneme type.

As shown in FIG. 3, in the first embodiment, a symbol "*" is used as the determination tag. That is, it implies that a phonemic model having a phonemic model name prefixed with the symbol "*" allows utilizing only a small amount of speech data for training.

In FIG. 3, phonemic models that allows utilizing only a small amount of speech data for training: "TH_a", "TH_d", and "ZH_a" are prefixed with the determination tag "*", and represented as "*TH_a", "*TH_d", and "*ZH_a", respectively. That is, the phonemic models of the phoneme "a" in That, the phoneme "d" in That, and the phoneme "a" in Chinese allow utilizing only a small amount of speech data for training.

In the tree structure as shown in FIG. 3, a set of phonemic models included in a parent node is a sum of sets of phonemic models included in all child nodes of the parent node. Conversely, sets of the phonemic models included in two child nodes of a parent node are child sets obtained by partitioning a set of phonemic models included in the parent node, respectively.

To cluster phonemic models using the tree structure, a root node including all phonemic models to be clusters is set first. Child nodes are newly generated from the root node. A process of generating child nodes of all nodes having no child node at a certain point in time is then repeatedly performed. In the tree structure thus generated, a set of phonemic models included in each leaf node is obtained as a cluster of phonemic models. In the example as shown in FIG. 3, four clusters of phonemic models: (*TH_a, TH_b, *ZH_a), (ZH_c), (*TH_d, ZH_d), and (EN_a, EN_b, EN_c) are obtained. One or more phonemic models included in a phonemic model cluster thus obtained are expected to be sufficiently similar to each other.

Returning to FIG. 1, a detailed structure of the tree generating unit 110 is explained. As shown in FIG. 1, the tree generating unit 110 includes a node initializing unit 111, a candidate generating unit 112, a candidate deleting unit 113, a similarity calculating unit 114, a candidate selecting unit 115, and a node generating unit 116.

The node initializing unit 111 initializes nodes of a tree structure. More specifically, the node initializing unit 111 generates a root node of a tree structure including inputted phonemic models as a node initial value of the tree structure.

The candidate generating unit 112 partitions a set of phonemic models included in a node having no child node at an arbitrary point in time during a tree generating process, into two child sets for allocating the phonemic models to two child nodes, and generates candidates each including a pair of partitioned two child sets (hereinafter, "partitioning candidates"). More specifically, the candidate generating unit 112 refers to a question list stored in the storage unit 130 as mentioned below, and partitions the phonemic models into phonemic models complying with each of questions in the question list and phonemic models not complying with each question, thereby generating partitioning candidates according to the questions. Details of the question list and the method of partitioning a set of the phonemic models using the question list are explained below.

When nodes are initialized, that is, when there is only a root node, the root node is only a node having no child node. Therefore, the candidate generating unit 112 generates partitioning candidates for the root node.

When there is a partitioning candidate among the generated partitioning candidates, in which at least one of two child sets in the partitioning candidate includes only phonemic models attached with the determination tag, the candidate deleting unit 113 deletes the partitioning candidate. Accordingly, it is possible to prevent only phonemic models that allow utilizing only a small amount of speech data for training from being classified into the same cluster.

The similarity calculating unit 114 calculates a sum of cross-similarities among phonemic models in child sets included in each of partitioning candidates. More specifically, the similarity calculating unit 114 first calculates a cross-similarity among phonemic models in each of two child sets included in each of the partitioning candidates other than partitioning candidates deleted by the candidate deleting unit 113. The similarity calculating unit 114 then calculates a sum of the calculated cross-similarities of the child sets. In this way, the similarity calculating unit 114 can obtain the sum of cross-similarities of each partitioning candidate.

A method of calculating a cross-similarity when the states in the HMM are phonemic models is explained.

A set of clustering-target phonemic models will be given as a set of i-th states Sim in the HMM, and an output probability Pim(X) of the states Sim will be given by the normal distribution $N(\mu im, \Sigma im)$. In this regard, m denotes an index assigned to the states of the HMM to be clustered.

A set of phonemic models the cross-similarities of which are to be calculated, that is, a set of the i-th states Sim in the HMM is denoted by M. A set of audio feature vectors $X_f$ used for training of the states of the HMM included in the set M is denoted by F. In this regard, a log likelihood calculated by a following formula (1) is used as a cross-similarity L(M) of the phonemic model set M.

$$L(M) = -\frac{1}{2}\left(\log\left[(2\pi)^N \left|\sum(M)\right|\right] + N\right) \sum_{m \in M} \sum_{f \in F} \gamma_s(X_f) \quad (1)$$

In this formula, N denotes the number of dimensions of the audio feature vector $X_f$, $\Sigma(M)$ denotes a shared covariance matrix of all HMM states included in the set M, and $\gamma_m(X_f)$ denotes a posterior probability of the audio feature vector $X_f$ with respect to the states Sim of the HMM.

The cross-similarity L(M) calculated by the formula (1) is higher when the phonemic models included in the set M are more similar to each other. That is, the cross-similarity L(M) has a quantitative evaluation value indicating a degree of cross-similarity among the phonemic models included in the set M. The method using the formula (1) is not the only method of calculating the cross-similarity, and any calculating method that enables to quantitatively represent the degree of cross-similarity among the phonemic models can be applied.

Further, a cross-distance D(M) among the HMM states included in the set M can be used instead of the cross-similarity. In this case, the cross-distance D(M) is larger when the cross-similarity L(M) is smaller, and the cross-distance D(M) is smaller when the cross-similarity L(M) is larger. Therefore, when it is defined as L(M)=1/D(M), for example, the cross-similarity L(M) can be calculated from the cross-distance D(M).

The cross-distance D(M) can be calculated, for example, by calculating a distance between two different states of the HMM with respect to all states of the HMM belonging to the set M, and obtaining a sum of the calculated distances. To calculate a distance between two different states of the HMM, a method as described in "The Use of State Tying in Continuous Speech Recognition" (S. J. Young & P. C. Woodland, Eurospeech 93, pp. 2203 to 2206) can be applied, for example. The method of calculating the cross-distance D(M) is not limited to this, and any calculating method commonly used can be applied.

The candidate selecting unit 115 refers to all of the sums of the cross-similarities of the partitioning candidates, calculated by the similarity calculating unit 114, and selects a partitioning candidate providing the largest sum of the cross-similarities as an optimum partitioning candidate.

The node generating unit 116 regards a node that is a generation source of the partitioning candidates as a new parent node, and generates two nodes including two child sets included in the optimum partitioning candidate, respectively, as new child nodes of the parent node.

The tree generating unit 110 repeats the candidate generating process performed by the candidate generating unit 112, the candidate deleting process performed by the candidate deleting unit 113, the similarity calculating process performed by the similarity calculating unit 114, the process of selecting an optimum partitioning candidate performed by the candidate selecting unit 115, and the node generating process performed by the node generating unit 116. The tree generating unit 110 stops the repeated processes when predetermined stop conditions are satisfied, and obtains a tree structure including nodes generated by then.

The tree generating unit 110 applies following conditions (1) to (4) as the stop conditions.
(1) When the number of the partitioning candidates generated by the candidate generating unit 112 is zero. That is, when all nodes having no child nodes at that point in time include only one phonemic model.
(2) When the candidate deleting unit 113 deletes all the generated partitioning candidates.
(3) When a difference between the sum of the cross-similarities of two child sets included in the optimum partitioning candidate selected by the candidate selecting unit 115, and the cross-similarity of a set of phonemic models included in a node that is a generation source of the optimum partitioning candidate is calculated, and the difference is below a predetermined threshold.
(4) When the number of nodes having no child node in the entire tree structure at a point in time when the node generating unit 116 generates new child nodes is calculated, and the calculated number exceeds a predetermined threshold.

The conditions (1) and (2) among the conditions described above are always used as the stop conditions. With respect to the conditions (3) and (4), one or both of these conditions can be used. Only the conditions (1) and (2) can be used without using the conditions (3) and (4).

The condition (3) is used to stop the processes when an increase ratio of cross-similarity after node partitioning to cross-similarity before the node partitioning is small. When this condition is applied, a partitioning process that produces a small partitioning effect can be avoided to enhance the efficiency of processing. When the condition (4) is applied, it is possible to prevent the number of partitioned nodes from being too large.

The clustering unit 120 refers to the tree structure that is finally obtained when the stop conditions above mentioned are met, and obtains sets of phonemic models included in nodes of the tree structure as clusters of the phonemic models. In this way, the phonemic models are clustered in units of phonemic model sets each included in each of the nodes of the tree structure.

The storage unit 130 stores therein a question list that is referred to by the candidate generating unit 112 to partition a set of phonemic models. As shown in FIG. 4, a question list contains questions in the form of "is_ph=(detailed question)" or "is_lang=(detailed question)" in the form of list. For example, "is_ph=a?" indicates a question asking whether a phoneme type is "a", and "is_ph=(a|b)?" is a question asking whether a phoneme type is "a" or "b". Further, "is_lang=TH?" indicates a question asking whether a language type is "TH" (That).

The storage unit 130 can be any storage medium commonly used, such as a hard disk drive (HDD), an optical disk, a memory card, and a random access memory (RAM).

A clustering process performed by the clustering apparatus 100 according to the first embodiment is explained next with reference to FIG. 5.

The input unit 101 first inputs plural phonemic models to be clustered (Step S501). As described above, the input unit 101 inputs plural phonemic models including at least one phonemic model that allows utilizing only a small amount of speech data for training, and at least one phonemic model that allows utilizing a relatively large amount of speech data for training. The phonemic model that allows utilizing only a small amount of speech data for training is attached with the determination tag.

Figures 6, 7:
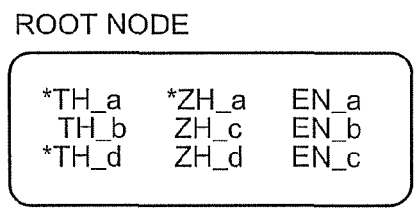
FIG. 6 is a drawing illustrating an example of a root node.
FIG. 7 is a drawing illustrating an example of partitioning candidates.

The node initializing unit 111 then sets a node including all the inputted phonemic models as a root node of a tree structure (Step S502). FIG. 6 depicts an example of a root node generated when phonemic models of phonemes a, b, and d of That (TH), phonemic models of phonemes a, c, and d of Chinese (ZH), and phonemic models of phonemes a, b, and c of English (EN) are inputted like in the case as shown in FIG. 3.

Returning to FIG. 5, the candidate generating unit 112 generates at least one partitioning candidate for each of all nodes having no child node at that point in time, by partitioning a set of phonemic models included in each of the nodes into two child sets using a question list (Step S503).

FIG. 7 depicts an example of partitioning candidates generated for a node (hereinafter, "node A") including four phonemic models of "*TH_a", "TH_b", "*ZH_a", and "ZH_c", by applying the question list as shown in FIG. 4.

As shown in FIG. 7, when the question list as shown in FIG. 4 is applied to the node A, four partitioning candidates are generated. For the purpose of explanation, the table of FIG. 7 shows questions applied to the partitioning candidates, respectively. When a set of phonemic models is partitioned according to whether the answer of a question is YES or NO, plural questions may generate the same partitioning candidates. For example, in the case as shown in FIG. 7, the same partitioning candidates are generated by applying questions shown in parentheses.

When partitioning candidates are generated by the method using the question list, a smaller number of partitioning candidates are generated as compared to a method of generating partitioning candidates according to random partitioning (which is described later in detail). However, in the partitioning-candidate generating method using the question list, questions that enable to generate one or both of two child sets in a partitioning candidate, expected to include phonemic models similar to each other, can be applied based on phonetic knowledge related to the phonemic models to be clustered.

For example, a question "is_ph=a?" asking whether the phoneme type is "aa" can be added to the question list based on knowledge that the phonemic models "TH_a" and "ZH_a" corresponding to the same phoneme type "a" are similar to each other. In this way, a partitioning candidate that provides a child set including "TH_a" and "ZH_a" can be generated based on the question. On the contrary, a question "is_ph= (a|c)?" asking whether the phonemic type is "a" or "c" can be eliminated from the question list, based on knowledge that the phonemic models "TH_a" and "ZH_c" are not similar to each other. Accordingly, it is possible to avoid generation of a partitioning candidate that provides a child set including "TH_a" and "ZH_c".

As described above, when the question list is prepared based on the phonetic knowledge, the efficiency in generation of partitioning candidates during clustering of phonemic models can be enhanced.

The above mentioned "Tree-based state tying for high accuracy acoustic modeling" describes advantages in using questions related to phoneme types during clustering of phonemic models using a tree structure, and a method of using such questions. In the first embodiment, questions related to language types are added to the question list, in addition to the questions related to the phoneme types. Accordingly, partitioning candidates can be generated according to differences in language types.

Returning to FIG. 5, the candidate deleting unit 113 checks all the generated partitioning candidates, and when there is a partitioning candidate having two child sets, at least one of which includes only phonemic models attached with the determination tag, deletes the partitioning candidate (Step S504). That is, partitioning candidates that have child sets including only phonemic models that allow utilizing only a small amount of speech data for training are deleted from the generated partitioning candidates.

FIG. 8 depicts an example in which a partitioning candidate A1 including a child set (*TH_a and *ZH_a) is deleted from the partitioning candidates as shown in FIG. 7. FIG. 8 depicts an example in which partitioning candidate deletion is performed only for the partitioning candidates generated from the node A including four phonemic models above mentioned. The candidate deleting unit 113 practically performs the candidate deleting process for all the partitioning candidates generated from all nodes that have been subjected to the candidate generating process (Step S503).

Returning to FIG. 5, the similarity calculating unit 114 then calculates a sum of cross-similarities of two child sets included in each of all partitioning candidates that are not deleted in the candidate deleting process (Step S505). More specifically, the similarity calculating unit 114 calculates a cross-similarity of each child set in each partitioning candidate according to the formula (1) above mentioned, and calculates the sum of the cross-similarities calculated for two child sets.

The candidate selecting unit 115 then refers to all the calculated sums of the cross-similarities of the partitioning candidates, and selects one of the partitioning candidates providing the largest sum of the cross-similarities as the optimum partitioning candidate (Step S506).

FIG. 9 depicts partitioning candidates (A2, A3, A4, B1, B2, . . . ) generated from the node A and a node B different from the node A by the candidate generating unit 112, other than a partitioning candidate deleted by the candidate deleting unit 113, and the sums of cross-similarities calculated with respect to the partitioning candidates by the similarity calculating unit 114, respectively.

This example assumes that the nodes A and B are targets for the candidate generating process, that is, nodes having no child node at this point in time. The candidate selecting unit 115 selects a partitioning candidate A3 that provides the largest sum of the cross-similarities from these partitioning candidates. That is, the candidate selecting unit 115 applies a question "is_ph=c?" to the node A, thereby selecting a partitioning candidate that provides two child sets (ZH_c) and (*TH_a, TH_b, *ZH_a).

Returning to FIG. 5, the node generating unit 116 then regards a node, which is a generation source of the selected optimum partitioning candidates, as a parent node, and generates two nodes including two child sets included in the optimum partitioning candidate, respectively, as new child nodes for the parent node (Step S507).

Figure 10:
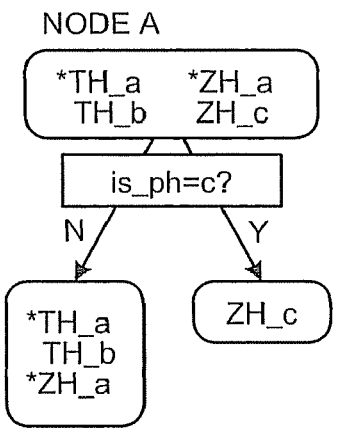
FIG. 10 is a drawing illustrating an example of child nodes generated.

FIG. 10 depicts an example in which the optimum partitioning candidate A3 shown in FIG. 9 is referred to, the node A that provides the optimum partitioning candidate A3 is regarded as a new parent node, and then two nodes including the two child sets (ZH_c) and (*TH_a, TH_b, *ZH_a) provided by the optimum partitioning candidate A3, respectively, are generated as new child nodes of the node A.

In FIG. 10, for the purpose of explanation, the question "is_ph=c?" applied to generate the partitioning candidate A3 is shown below the node A. Directed arcs are attached with "Y (YES)" or "N (NO)" to indicate whether the answer to the questions is YES or NO. That is, a child node as a destination of the directed arc attached with "Y" includes a set of phonemic models complying with the question in the set of phonemic models included in the node A, and a child node as a destination of the directed arc attached with "N" includes the other set of phonemic models.

Returning to FIG. 5, the tree generating unit 110 then determined whether predetermined stop conditions are met (Step S508). When the stop conditions are not met (NO at Step S508), the processes are further repeated for nodes having no child node at this point in time (Step S503).

Figure 11:
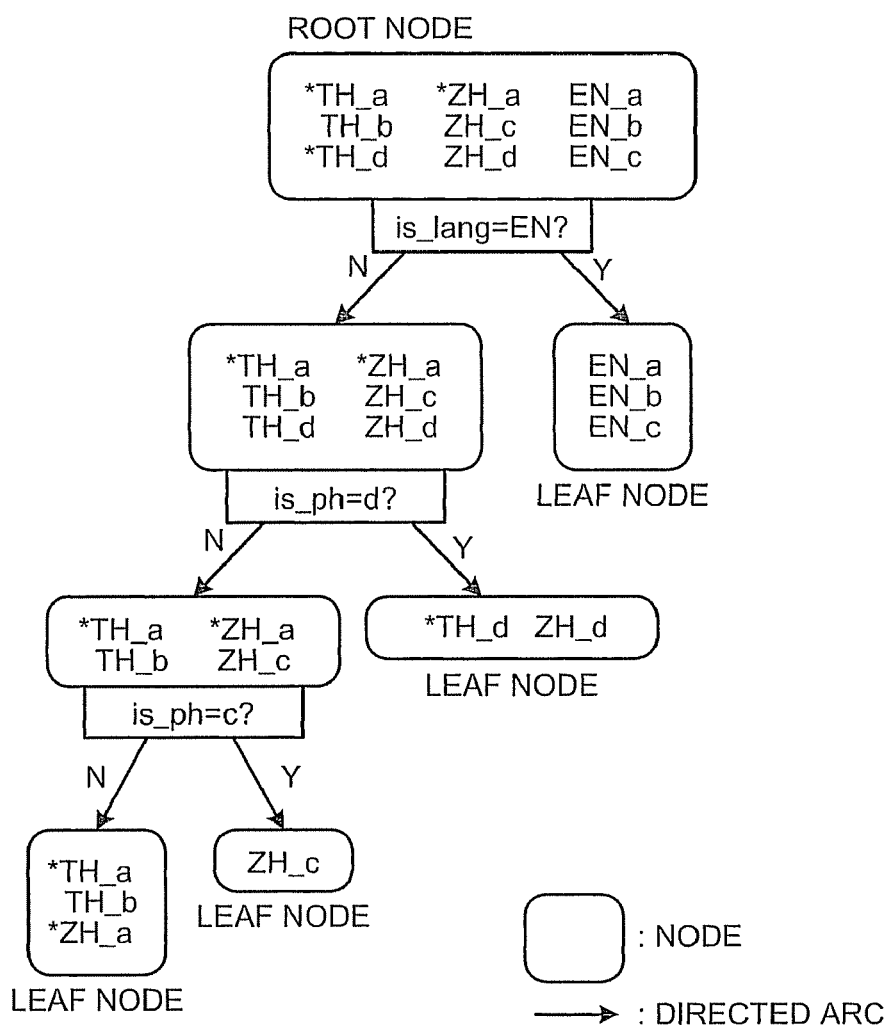
FIG. 11 is a drawing illustrating an example of a tree structure generated.

When the stop conditions are met (YES at Step S508), the tree generating unit 110 terminates the tree generating process. In this way, a tree structure having four leaf nodes as shown in FIG. 11 is generated from the root node as shown in FIG. 6, for example. FIG. 11 also depicts the question list used by the candidate generating unit 112.

When the tree generating process terminates, the clustering unit 120 refers to the generated tree structure, and obtains sets of phonemic models included in the nodes of the tree structure as clusters of the phonemic models (Step S509).

For example, the clustering unit 120 can obtain four clusters corresponding to sets of phonemic models (*TH_a, TH_b, *ZH_a), (ZH_c), (*TH_d, ZH_d), and (EN_a, EN_b, EN_c) included in leaf nodes of the tree structure as shown in FIG. 11.

As shown in FIG. 11, a cluster including a phonemic model attached with the determination tag "*" definitely includes at least one phonemic model not attached with the determination tag. For example, when the phonemic model "*TH_a" attached with the determination tag is focused, a cluster including "*TH_a" includes the phonemic model "TH_b" that is not attached with the determination tag. Similarly, a cluster including "*ZH_a" includes "TH_b", and a cluster including "*TH_d" includes "ZH_d".

Figure 5:
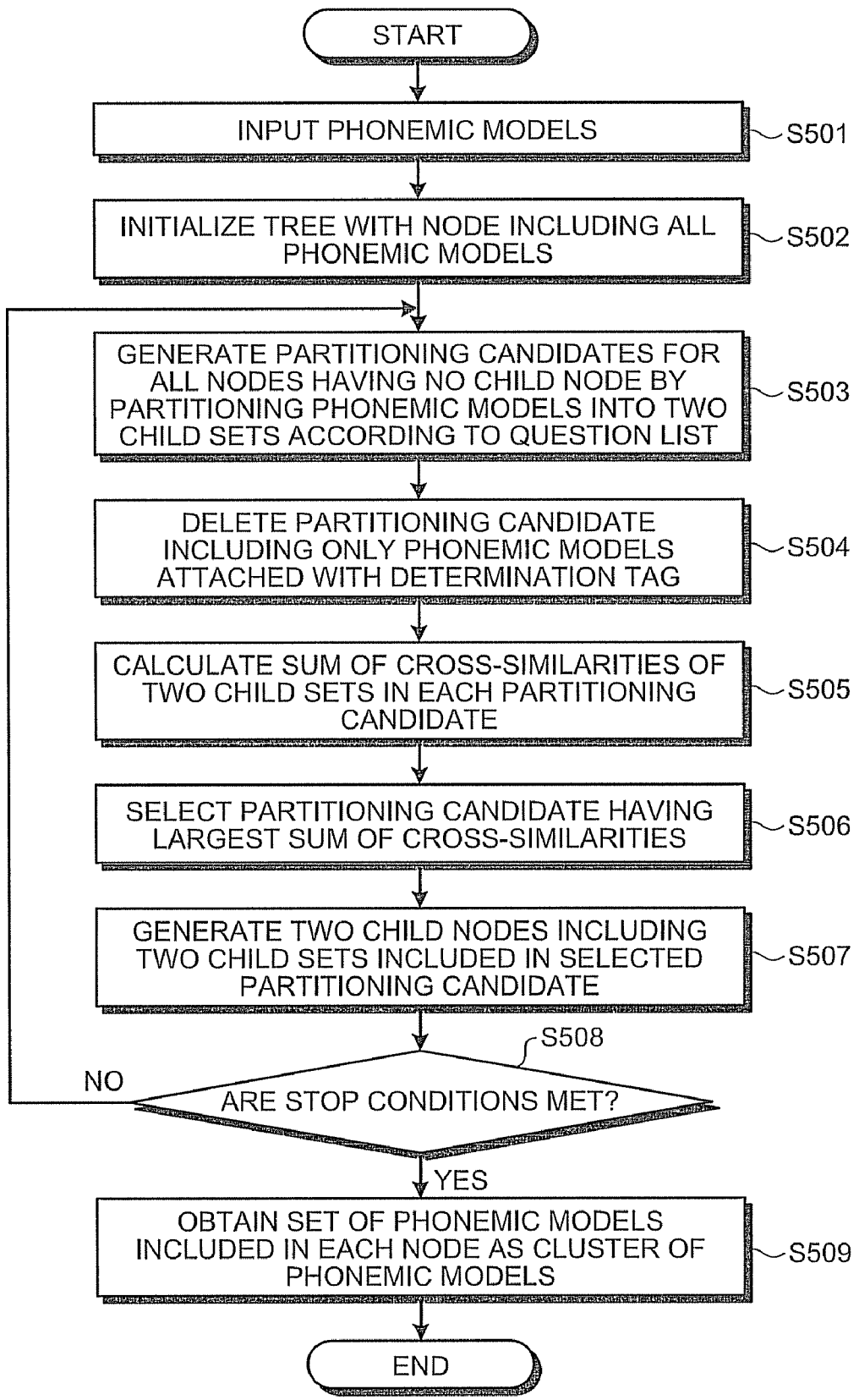
FIG. 5 is a flowchart of an entire clustering process according to the first embodiment.

When the phonemic models are clustered according to the flowchart as shown in FIG. 5, a requirement can be met that an arbitrary phonemic model attached with the determination tag and at least one phonemic model not attached with the determination tag belong to the same cluster.

This is because partitioning candidates that provide child sets including only phonemic models attached with the determination tag "*" are deleted in the candidate deleting process (Step S504), and child nodes including such child sets are not generated in the node generating process (Step S507). That is, in the first embodiment, the candidate deleting process ensures that a cluster of phonemic models obtained by the clustering unit 120 meets the predetermined requirement.

The clustering unit 120 can obtain a set of phonemic models included in an arbitrary node as a cluster, in addition to sets of phonemic models included in leaf nodes. For example, the clustering unit 120 can obtain a set of phonemic models (*TH_a, TH_b, *ZH_a, ZH_c) included in a parent node of the leaf nodes that provide the cluster (*TH_a, TH_b, *ZH_a) and the cluster (ZH_c), respectively, as a cluster of the phonemic models.

As described above, the clustering using the tree structure enables to obtain clusters having a parent-child relation reflecting a parent-child relation in the generated tree structure. Also in this case, the requirement that an arbitrary phonemic model attached with the determination tag and at least one phonemic model not attached with the determination tag definitely belong to the same cluster is met.

(Modification)

The example in which the candidate generating unit 112 partitions a set of phonemic models using the question list has been explained. However, this example is not the only method of generating partitioning candidates, and a method of partitioning a given set of phonemic models according to all possible partitioning patterns (hereinafter, "a method of generating partitioning candidate according to random partitioning") can be applied, for example.

FIG. 12 depicts an example of partitioning candidates that are obtained by partitioning the node A as mentioned above by this method. As shown in FIG. 12, seven partitioning candidates are generated from the node A. FIG. 13 depicts an example of partitioning candidates deleted from the partitioning candidates as shown in FIG. 12 in the candidate deleting process. As shown in FIG. 13, partitioning candidates A1, A3, and A6 that provide child sets (*TH_a), (*ZH_a), and (*TH_a, *ZH_a), respectively, are deleted from the partitioning candidates generated according to the random partitioning.

As described above, the clustering apparatus 100 according to the first embodiment can cluster phonemic models using a tree structure while meeting the requirement that an arbitrary phonemic model that allows utilizing only a small amount of speech data for training and at least one phonemic model that allows utilizing a relatively large amount of speech data for training definitely belong to the same cluster. Accordingly, with respect to a phonemic model that allows utilizing only a small amount of speech data, a similar phonemic model that allows utilizing a large amount of speech data is selected to perform the adaptive training. That is, it is possible to obtain highly-accurate phonemic models based on the adaptive training.

In the Southeast Asian languages including That, there are some cases where only a small amount of speech data for training can be used in all phonemic models of the languages. On the other hand, in Chinese and Euro-American languages including English, a relatively large amount of speech data for training can be used in all phonemic models of the languages.

In such situations, when clustering of phonemic models is to be performed for all phonemic models of That, Chinese, and English, the clustering of phonemic models using a tree structure can be performed to meet a requirement that an arbitrary phonemic model of That and at least one phonemic model of Chinese or English definitely belong to the same cluster.

In a second embodiment of the present invention, determination information (hereinafter, "language determination tag") for determining a phonemic model of a language that allows obtaining only a small amount of speech data for training is attached to phonemic models in units of languages. Partitioning candidates including only phonemic models attached with the language determination tag are deleted.

Figure 14:
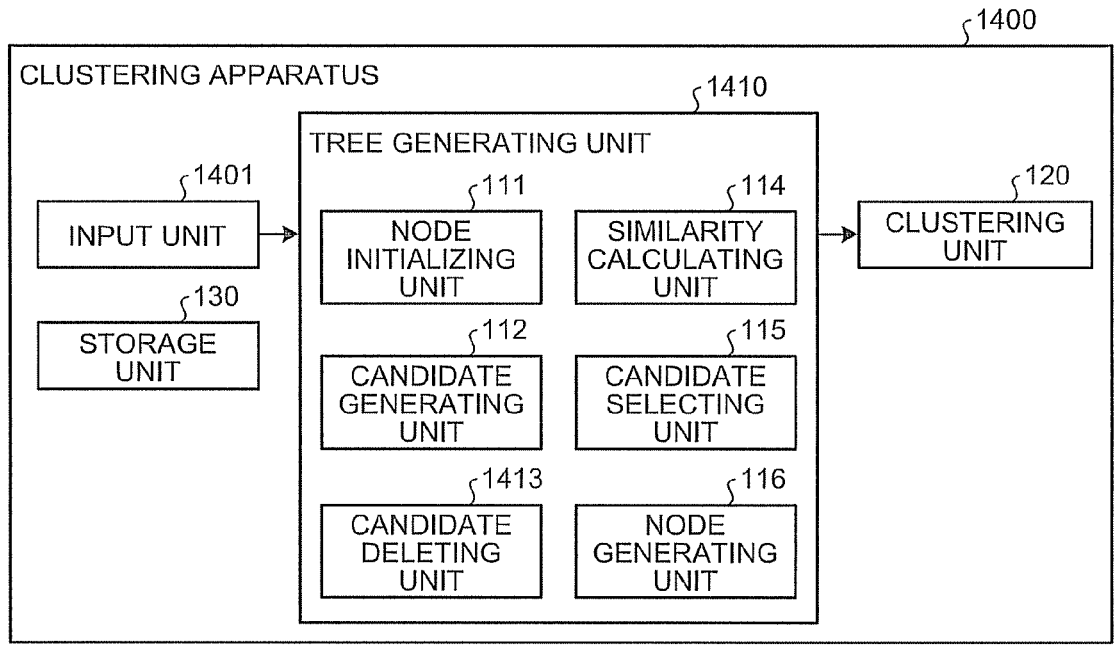
FIG. 14 is a block diagram of a clustering apparatus according to a second embodiment of the present invention.

As shown in FIG. 14, a clustering apparatus 1400 includes the storage unit 130, an input unit 1401, a tree generating unit 1410, and the clustering unit 120.

In the second embodiment, functions of the input unit 1401 and a candidate deleting unit 1413 of the tree generating unit 1410 are different from those of the input unit 101 and the candidate deleting unit 113 according to the first embodiment. Other constituent elements and functions are the same as those explained with reference to FIG. 1, which is the block diagram of the configuration of the clustering apparatus 100 according to the first embodiment. Therefore, these elements are denoted by like reference numerals as those in FIG. 1, and explanations thereof will be omitted.

The input unit 1401 inputs at least one phonemic model attached with the language determination tag, and at least one phonemic model not attached with the language determination tag.

When there is a partitioning candidate that provides two child sets at least one of which includes only phonemic models attached with the language determination tag in the generated partitioning candidates, the candidate deleting unit 1413 deletes the partitioning candidate.

A clustering process performed by the clustering apparatus 1400 according to the second embodiment is explained next. In the second embodiment, a phonemic-model input process performed by the input unit 1401, and a candidate deleting process performed by the candidate deleting unit 1413 are different from those in the clustering process according to the first embodiment.

More specifically, the second embodiment is changed in that the input unit 1401 inputs a phonemic model attached with the language determination tag instead of the determination tag at Step S501 in FIG. 5, which depicts the clustering process according to the first embodiment. The second embodiment is further changed in that the candidate deleting unit 1413 deletes a partitioning candidate when at least one of two child sets of the partitioning candidate includes only phonemic models attached with the language determination tag at Step S504 in FIG. 5.

Other processes (Steps S502, S503, and S505 to S509) are the same as those in the first embodiment, and thus explanations thereof will be omitted.

As described above, the clustering apparatus 1400 according to the second embodiment can cluster phonemic models using a tree structure while meeting a requirement that phonemic models of a language that allows utilizing only a small amount of speech data for training and at least one phonemic model of a language that allows utilizing a relatively large amount of speech data for training definitely belong to the same cluster. Accordingly, it is possible to select, with respect to phonemic models that allow utilizing only a small amount of speech data, a similar phonemic model that allows utilizing a large amount of speech data, thereby performing the adaptive training.

With respect to a phonemic model that allows utilizing a large amount of speech data for training, there is no need to obtain a similar phonemic model by the clustering and to perform the adaptive training. Therefore, when a node including a set of phonemic models including only phonemic models that allows utilizing a large amount of speech data for training is generated during generation of a tree generation, it is unnecessary to generate partitioning candidates from the node. Thus, a clustering apparatus according to a third embodiment of the present invention generates partitioning candidates only for a node including at least one phonemic model attached with the determination tag.

Figure 15:
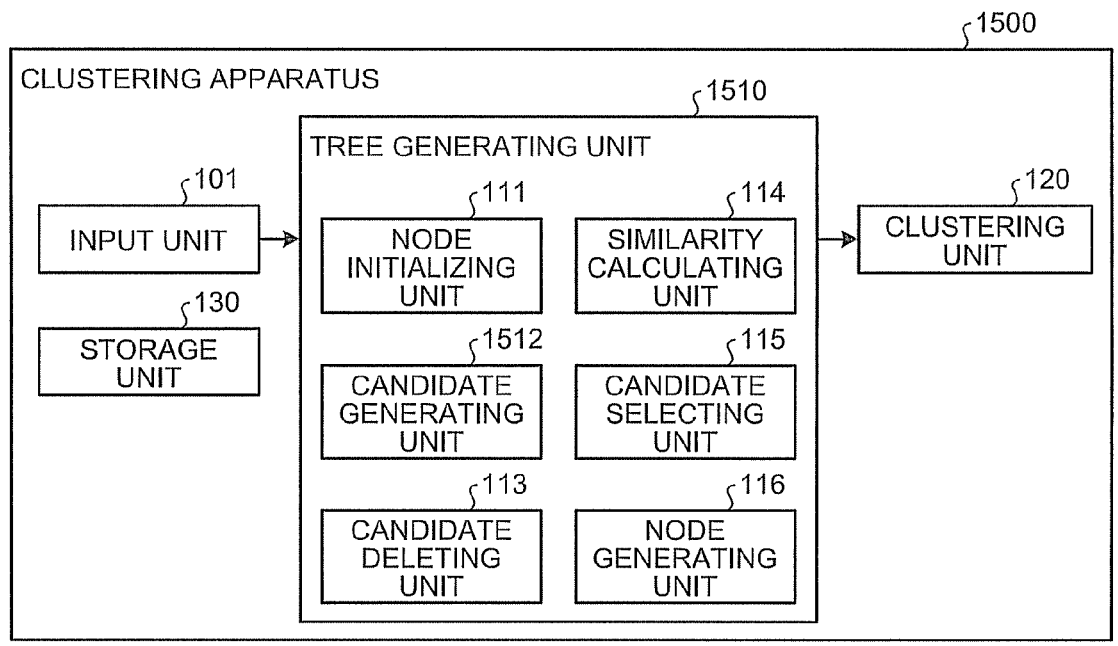
FIG. 15 is a block diagram of a clustering apparatus according to a third embodiment of the present invention.

As shown in FIG. 15, a clustering apparatus 1500 includes the storage unit 130, the input unit 101, a tree generating unit 1510, and the clustering unit 120.

In the third embodiment, a function of a candidate generating unit 1512 of the tree generating unit 1510 is different from that of the candidate generating unit 112 according to the first embodiment. Other constituent elements and functions are the same as those explained with reference to FIG. 1, which is the block diagram of the configuration of the clustering apparatus 100 according to the first embodiment. Therefore, these elements are denoted by like reference numerals as those in FIG. 1, and explanations thereof will be omitted.

The candidate generating unit 1512 generates partitioning candidates only for a node having no child node and including at least one phonemic model attached with the determination tag, by partitioning a set of phonemic models included in the node into two child sets.

A clustering process performed by the clustering apparatus 1500 according to the third embodiment is explained next. In the third embodiment, a candidate generating process performed by the candidate generating unit 1512 is different from that in the clustering process according to the first embodiment.

More specifically, the third embodiment is different from the first embodiment in that the candidate generating unit 1512 performs the candidate generating process to all nodes each having no child node and including at least one phonemic model attached with the determination tag at Step S503 in FIG. 5, which depicts the clustering process according to the first embodiment.

Other processes (Steps S501, S502, and S504 to S509) are the same as those according to the first embodiment, and thus explanations thereof are omitted.

As described above, the clustering apparatus 1500 according to the third embodiment can generates partitioning candidates only for nodes each including at least one phonemic model attached with the determination tag. Accordingly, generation of unnecessary partitioning candidates is suppressed, and the processing cost required when the phonemic-model clustering method using a tree structure is applied can be reduced.

Figure 16:
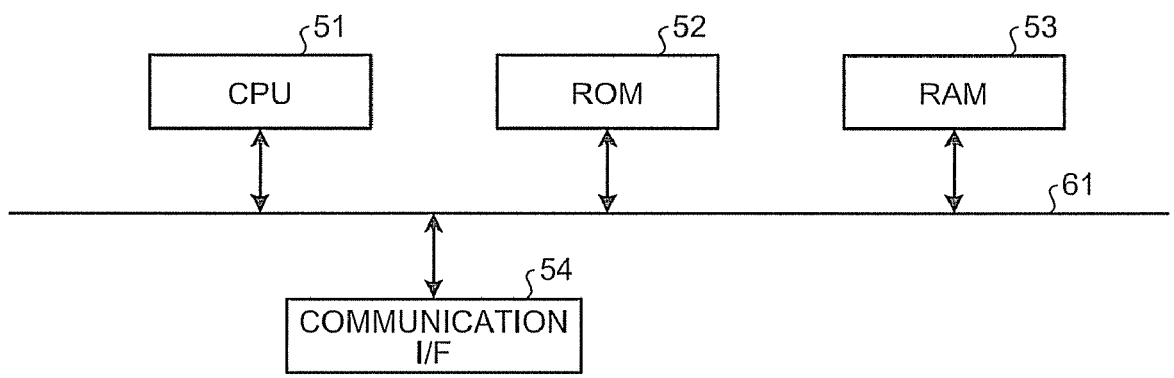
FIG. 16 is a drawing illustrating a hardware configuration diagram of the clustering apparatus according to the first to third embodiments.

A hardware configuration of the clustering apparatus according to any of the first to third embodiments is explained next with reference to FIG. 16.

The clustering apparatus according to any of the first to third embodiments includes a controller such as a central processing unit (CPU) 51, a storage device such as a read only memory (ROM) 52 and a RAM 53, a communication interface (I/F) 54 for connecting to a network to establish communications, and a bus 61 that connects these units.

A clustering program executed by the clustering apparatus (e.g., a computer) according to any of the first to third embodiment is stored in the ROM 52 or the like in advance and provided.

The clustering program can be stored on a computer-readable medium such as a compact disc read only memory (CD-ROM), a flexible disk (FD), a compact disk recordable (CD-R), or a digital versatile disk (DVD) as a file of an installable format or an executable format and provided.

The clustering program can be configured such that it is stored in a computer connected to a network such as the Internet, downloaded through the network, and provided. Alternatively, the clustering program can be provided or distributed through a network such as the Internet.

The clustering program has a module configuration including the units mentioned above (the input unit, the tree generating unit, and the clustering unit). As practical hardware, the CPU 51 reads the clustering program from the ROM 52, and executes the program, so that the units mentioned above are loaded into a main memory, and generated on the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A clustering apparatus comprising:
   an input unit configured to input at least one phonemic model attached with determination information indicating a small amount of speech data for training, and at least one phonemic model not attached with the determination information;
   a node initializing unit configured to generate a node including the inputted phonemic models as a root node of a tree structure;
   a candidate generating unit configured to generate candidates of a pair of child sets for a node having no child node among nodes in the tree structure, by partitioning a set of phonemic models included in the node into two;
   a candidate deleting unit configured to delete a candidate including the two child sets at least one of which includes only phonemic models attached with the determination information, from the generated candidates;
   a similarity calculating unit configured to calculate a similarity among the phonemic models included in each of the two child sets included in each of the candidates other than the deleted candidates, and calculates a sum of the similarities calculated for the child sets;
   a candidate selecting unit configured to select one of the candidates having a largest calculated sum;
   a node generating unit configured to generate two nodes including two child sets included in the selected candidate, respectively, as child nodes of the node that is a generation source of the selected candidate; and
   a clustering unit configured to cluster the phonemic models in units of phonemic model sets included in nodes of the tree structure.

2. The apparatus according to claim 1, wherein
   the input unit inputs at least one phonemic model attached with language determination information indicating a language having a small amount of the speech data as the determination information, and at least one phonemic model not attached with the language determination information, and
   the candidate deleting unit deletes a candidate including the two child sets at least one of which includes only phonemic models attached with the language determination information, from the generated candidates.

3. The apparatus according to claim 1, wherein the candidate generating units generates the candidates for nodes each having no child node and including phonemic models attached with the determination information, among the nodes of the tree structure.

4. The apparatus according to claim 1, wherein each of the phonemic models corresponds to each state of a Hidden Markov Model (HMM) that is obtained by modeling a transition relation among acoustical features of phonemes.

5. A clustering method comprising:
   inputting at least one phonemic model attached with determination information indicating a small amount of speech data for training, and at least one phonemic model not attached with the determination information;
   generating a node including the inputted phonemic models as a root node of a tree structure;
   generating candidates of a pair of child sets for a node having no child node among nodes in the tree structure, by partitioning a set of phonemic models included in the node into two;
   deleting a candidate including the two child sets at least one of which includes only phonemic models attached with the determination information, from the generated candidates;
   calculating a similarity among the phonemic models included in each of the two child sets included in each of the candidates other than the deleted candidates, and calculating a sum of the similarities calculated for the child sets;
   selecting one of the candidates having a largest calculated sum;
   generating two nodes including two child sets included in the selected candidate, respectively, as child nodes of the node that is a generation source of the selected candidate; and
   clustering the phonemic models in units of phonemic model sets included in nodes of the tree structure.

6. A program stored on a nontransitory computer readable medium including programmed instructions for clustering phonemic models, wherein the instructions, when executed by a computer, cause the computer to perform:
   inputting at least one phonemic model attached with determination information indicating a small amount of speech data for training, and at least one phonemic model not attached with the determination information;
   generating a node including the inputted phonemic models as a root node of a tree structure;
   generating candidates of a pair of child sets for a node having no child node among nodes in the tree structure, by partitioning a set of phonemic models included in the node into two;
   deleting a candidate including the two child sets at least one of which includes only phonemic models attached with the determination information, from the generated candidates;
   calculating a similarity among the phonemic models included in each of the two child sets included in each of the candidates other than the deleted candidates, and calculating a sum of the similarities calculated for the child sets;
   selecting one of the candidates having a largest calculated sum;
   generating two nodes including two child sets included in the selected candidate, respectively, as child nodes of the node that is a generation source of the selected candidate; and
   clustering the phonemic models in units of phonemic model sets included in nodes of the tree structure.

* * * * *